Patented June 13, 1944

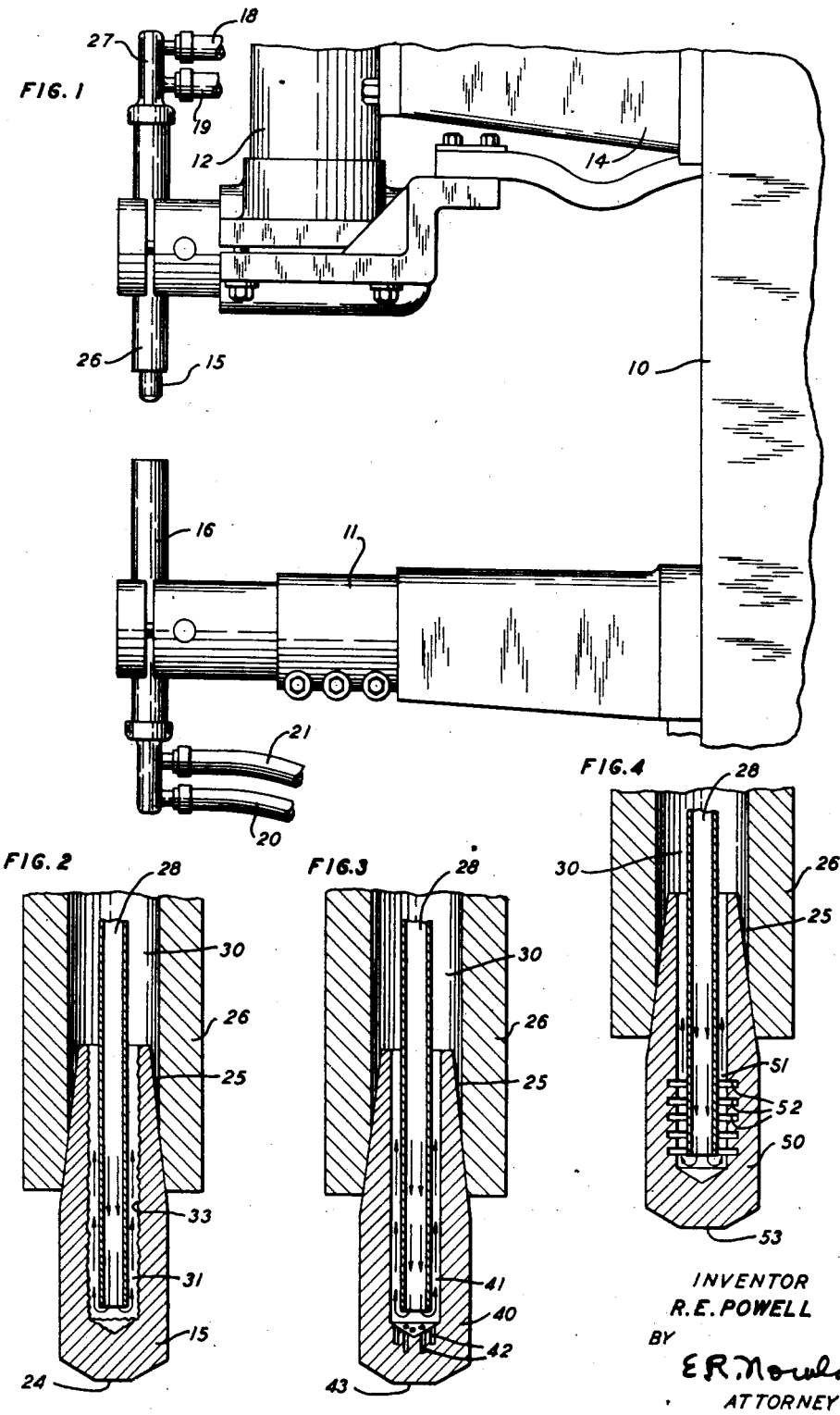

2,351,230

UNITED STATES PATENT OFFICE 2,351,230

WELDING ELECTRODE

Raymond E. Powell, Westfield, N. J., assignor to Western Electric Company, Incorporated, New York, N. Y., a corporation of New York Application December 5, 1942, Serial No. 467,941

1 Claim. (Cl. 219—4)

This invention relates to welding electrodes, particularly those of the fluid cooled type, and methods of making the same.

It is needless to say that welding electrodes are subjected to exceedingly high temperatures, particularly when employed for repeated operations on work. It is advantageous, therefore, in such instances to cool the electrodes with a cooling medium which may be circulated through the electrodes to positions in close proximity to the work faces thereof. Various cooling media may be employed, yet the effectiveness of the cooling is in proportion to the temperature gradient between the work face and the temperature of the cooling medium being employed. Furthermore, the effectiveness of the gradient is in proportion to the area exposed to the cooling medium, and if this area is increased, the amount of heat transferred will be increased in the same ratio as the area is increased and thus the cooler will be the work face.

Objects of the invention are to provide an electrode for use in welding and a method of making the same so that it has a large heat transfer area which may be subjected to a cooling medium.

With these and other objects in view, the invention comprises a welding electrode and the method of making it by forming therein a passageway, for a cooling fluid, the walls of which provide a heat transfer area terminating short of the work face and forming cavities in certain of the walls of the passageway to increase the heat transfer area.

Other objects and advantages will be apparent from the following detailed description when considered in conjunction with the accompanying drawing, wherein Fig. 1 is a fragmentary side elevational view of a welding machine illustrating the invention;

Fig. 2 is a fragmentary vertical sectional view of the upper electrode shown in Fig. 1 and illustrating one specie of the invention, and Figs. 3 and 4 are similar vertical sectional views of welding electrodes illustrating other species of the invention.

Referring now to the drawing, attention is first directed to Fig. 1, which illustrates a spot welding machine 10 including a stationary electrode supporting arm 11 and a movable head 12 supported by an arm 14 for vertical movement, to move an upper electrode 15 relative to a lower electrode 16. These electrodes may be included in a welding circuit (not shown) and may be substantially identical in structure as far as the invention is concerned, they being provided with passageways for cooling fluids circulating through fluid lines 18 and 19 for the electrode 15 and fluid lines 20 and 21 for the electrode 16.

Considering now the specific structure of the electrode 15, attention is directed to its contour shown in Fig. 2, it having a work face 24 at its outer end, the opposite end being tapered, as at 25, to fit into a holder 26. The holder 26 is provided with a cap 27, having an inner passageway (not shown) which provides communication with the fluid line 18 and a central tube 28 and an outer passageway (not shown) which affords communication between the fluid line 19 and a chamber 30 of the holder 26. The tube 28 is supported by the cap 27 or by any suitable means (not shown) and extends downwardly within a passageway 31 in the electrode 15 to a point near the work face 24.

The passageway 31 is formed in the body of the electrode in any suitable manner, such as by drilling. If the passageway 31 were left with smooth walls, a heat transfer area of a given size would be provided. However, this area is greatly increased through the step of sandblasting or other suitable means, to roughen the surface of the passageway 31 as indicated at 33 and form depressions and projections therein. In this manner the surface area of the passageway is substantially double that of the former smooth walls, and as a result the heat transfer area is greatly increased in size. Therefore, the circulation of the cooling material through the tube 28 in the direction of the arrows, to the portion adjacent and opposite the work face 24, will cause the material to pass along the roughened wall of the passageway 31, the cooling effect being greatly increased. Furthermore, the cavities 33 tend to retard the flow of the cooling material and further tend to agitate it in its travel into and out of multitudinous cavities, to more effectively cool the electrode, particularly the portion adjacent the heat generating surfaces.

In Fig. 3, electrode 40 is similar in structure to the electrode 15 excepting the formation of the passageway 41 thereof. In this embodiment the passageway 41 is formed, for example, by drilling, increased transfer areas being provided by adding a plurality of cavities 42 at the lower extremity of the passageway 41 and projecting downwardly toward work face 43. Thus when the electrode 40 is mounted in the holder 26, the cooling material may be forced through the tube 28 in the directions of the arrows to a point adjacent the lower extremity of the passageway 41, the force of the material causing portions of it to pass into the smaller cavities 42 which are in alignment with the tube 28 and which direct the cooling medium to points closer to the working face 43. The cooling material in all embodiments returns from the passageway in the electrode, through the chamber 30 in the holder 26 to the fluid line 19. In this embodiment the wall of the passageway 41 may be smooth, yet the surface areas adjacent the heat generating portion of the electrode have been multiplied, thus increasing the effectiveness of the cooling fluid to decrease the temperature of the electrode.

In Fig. 4, electrode 50 is identical in structure to the electrodes 15 and 40 excepting the forming of the passageway 51, which in this embodiment is provided with a plurality of grooves 52, which may be termed cavities, to increase the surface area subjected to the cooling fluid and to not only retard the fluid but to give it a turbulent effect in its travel to more efficiently cool the electrode, particularly work face 53 thereof. Instead of a plurality of circular grooves, one spiral groove may be employed, if so desired. This electrode may be mounted in the holder 26 and receive the cooling fluid from the tube 28 in the same manner described regarding the structures shown in Figs. 2 and 3.

As previously stated, the effectiveness of the gradient is in proportion to the area exposed to the cooling fluid and, as illustrated in Figs. 2, 3 and 4, the areas exposed to the cooling fluid have been greatly increased so that the amount of heat transferred to these surfaces will proportionately be increased and as a result of the cooling fluid thereon, the work faces of the electrodes will be maintained at lower temperatures. This same principle applies whether the cooling material be a liquid or a refrigerant gas.

Although specific improvements of the invention have been shown and described, it will be understood that they are but illustrative and that various modifications may be made therein without departing from the scope and spirit of this invention as defined by the appended claim.

What is claimed is:

A welding electrode comprising a body having a work face, a circular passageway for a cooling fluid formed therein, the walls of which provide a heat transfer area terminating short of the work face, and a plurality of equally spaced annular grooves formed in the outer wall of the passageway to increase the heat transfer area and to disturb the travel of the cooling fluid through the passageway to effect reduction of the temperature of the work face.

RAYMOND E. POWELL.